United States Patent
Gutman et al.

(10) Patent No.: US 12,245,206 B2
(45) Date of Patent: Mar. 4, 2025

(54) INDICATION OF AN AVERAGING PARAMETER ASSOCIATED WITH A TRANSMITTER NONLINEAR MODEL

(71) Applicant: QUALCOMM Incorporated, San Diego, CA (US)

(72) Inventors: Igor Gutman, Hod HaSharon (IL); Junyi Li, Fairless Hills, PA (US); Pushkar Bajirao Kulkarni, San Diego, CA (US); Joseph Patrick Burke, San Diego, CA (US); Abdelrahman Mohamed Ahmed Mohamed Ibrahim, San Diego, CA (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 17/713,127

(22) Filed: Apr. 4, 2022

(65) Prior Publication Data
US 2023/0319793 A1    Oct. 5, 2023

(51) Int. Cl.
*H04W 72/04*    (2023.01)
*H04W 72/0446*    (2023.01)

(52) U.S. Cl.
CPC ............... *H04W 72/0446* (2013.01)

(58) Field of Classification Search
CPC .......... H04W 72/0446; H04W 72/231
See application file for complete search history.

(56) References Cited

U.S. PATENT DOCUMENTS

| | | | |
|---|---|---|---|
| 6,275,523 B1* | 8/2001 | Chen | H04B 17/18 375/261 |
| 7,263,144 B2* | 8/2007 | Sasson | H04L 27/38 375/345 |
| 2009/0129257 A1* | 5/2009 | Maltsev | H03F 1/0205 370/208 |
| 2013/0142284 A1* | 6/2013 | Asensio | H04L 27/368 330/149 |
| 2015/0311926 A1* | 10/2015 | Eliaz | H04B 1/3833 375/297 |
| 2019/0190552 A1* | 6/2019 | Sagi | H04L 25/0226 |
| 2019/0393908 A1* | 12/2019 | Choi | H04B 1/04 |
| 2020/0083934 A1* | 3/2020 | Nammi | H04B 17/30 |
| 2023/0009653 A1* | 1/2023 | Vejlgaard | H04B 7/0617 |
| 2023/0268943 A1* | 8/2023 | Lee | H04B 1/0475 455/114.2 |

* cited by examiner

*Primary Examiner* — Mahbubul Bar Chowdhury
(74) *Attorney, Agent, or Firm* — Guang Y. Zhang; Harrity & Harrity, LLP

(57) ABSTRACT

Various aspects of the present disclosure generally relate to wireless communication. In some aspects, a wireless communication device may receive, from another wireless communication device, an indication of an averaging parameter associated with a transmitter nonlinear model. The wireless communication device may estimate the transmitter nonlinear model based at least in part on the indication of the averaging parameter associated with the transmitter nonlinear model. Numerous other aspects are described.

30 Claims, 9 Drawing Sheets

INDICATION OF AN AVERAGING PARAMETER ASSOCIATED WITH A TRANSMITTER NONLINEAR MODEL

FIELD OF THE DISCLOSURE

Aspects of the present disclosure generally relate to wireless communication and to techniques and apparatuses for indication of an averaging parameter associated with a transmitter nonlinear model.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless communication device. The method may include receiving, from another wireless communication device, an indication of an averaging parameter associated with a transmitter nonlinear model. The method may include estimating the transmitter nonlinear model based at least in part on the indication of the averaging parameter associated with the transmitter nonlinear model.

Some aspects described herein relate to a method of wireless communication performed by a wireless communication device. The method may include determining one or more coherency factors associated with a transmitter nonlinear model. The method may include transmitting, to another wireless communication device, an indication of an averaging parameter associated with the transmitter nonlinear model, wherein the indication of the averaging parameter associated with the transmitter nonlinear model is based at least in part on the one or more coherency factors associated with the transmitter nonlinear model.

Some aspects described herein relate to a wireless communication device. The wireless communication device may include a memory and one or more processors coupled to the memory. The one or more processors may be configured to receive, from another wireless communication device, an indication of an averaging parameter associated with a transmitter nonlinear model. The one or more processors may be configured to estimate the transmitter nonlinear model based at least in part on the indication of the averaging parameter associated with the transmitter nonlinear model.

Some aspects described herein relate to a wireless communication device. The wireless communication device may include a memory and one or more processors coupled to the memory. The one or more processors may be configured to determine one or more coherency factors associated with a transmitter nonlinear model. The one or more processors may be configured to transmit, to another wireless communication device, an indication of an averaging parameter associated with the transmitter nonlinear model, wherein the indication of the averaging parameter associated with the transmitter nonlinear model is based at least in part on the one or more coherency factors associated with the transmitter nonlinear model.

Some aspects described herein relate to a non-transitory computer-readable medium that stores a set of instructions for wireless communication by a wireless communication device. The set of instructions, when executed by one or more processors of the wireless communication device, may cause the wireless communication device to receive, from another wireless communication device, an indication of an averaging parameter associated with a transmitter nonlinear model. The set of instructions, when executed by one or more processors of the wireless communication device, may cause the wireless communication device to estimate the transmitter nonlinear model based at least in part on the indication of the averaging parameter associated with the transmitter nonlinear model.

Some aspects described herein relate to a non-transitory computer-readable medium that stores a set of instructions for wireless communication by a wireless communication device. The set of instructions, when executed by one or more processors of the wireless communication device, may cause the wireless communication device to determine one or more coherency factors associated with a transmitter nonlinear model. The set of instructions, when executed by one or more processors of the wireless communication device, may cause the wireless communication device to transmit, to another wireless communication device, an indication of an averaging parameter associated with the transmitter nonlinear model, wherein the indication of the averaging parameter associated with the transmitter nonlinear model is based at least in part on the one or more coherency factors associated with the transmitter nonlinear model.

Some aspects described herein relate to an apparatus for wireless communication. The apparatus may include means for receiving, from a wireless communication device, an indication of an averaging parameter associated with a transmitter nonlinear model. The apparatus may include means for estimating the transmitter nonlinear model based at least in part on the indication of the averaging parameter associated with the transmitter nonlinear model.

Some aspects described herein relate to an apparatus for wireless communication. The apparatus may include means for determining one or more coherency factors associated with a transmitter nonlinear model. The apparatus may include means for transmitting, to a wireless communication device, an indication of an averaging parameter associated with the transmitter nonlinear model, wherein the indication of the averaging parameter associated with the transmitter nonlinear model is based at least in part on the one or more coherency factors associated with the transmitter nonlinear model.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
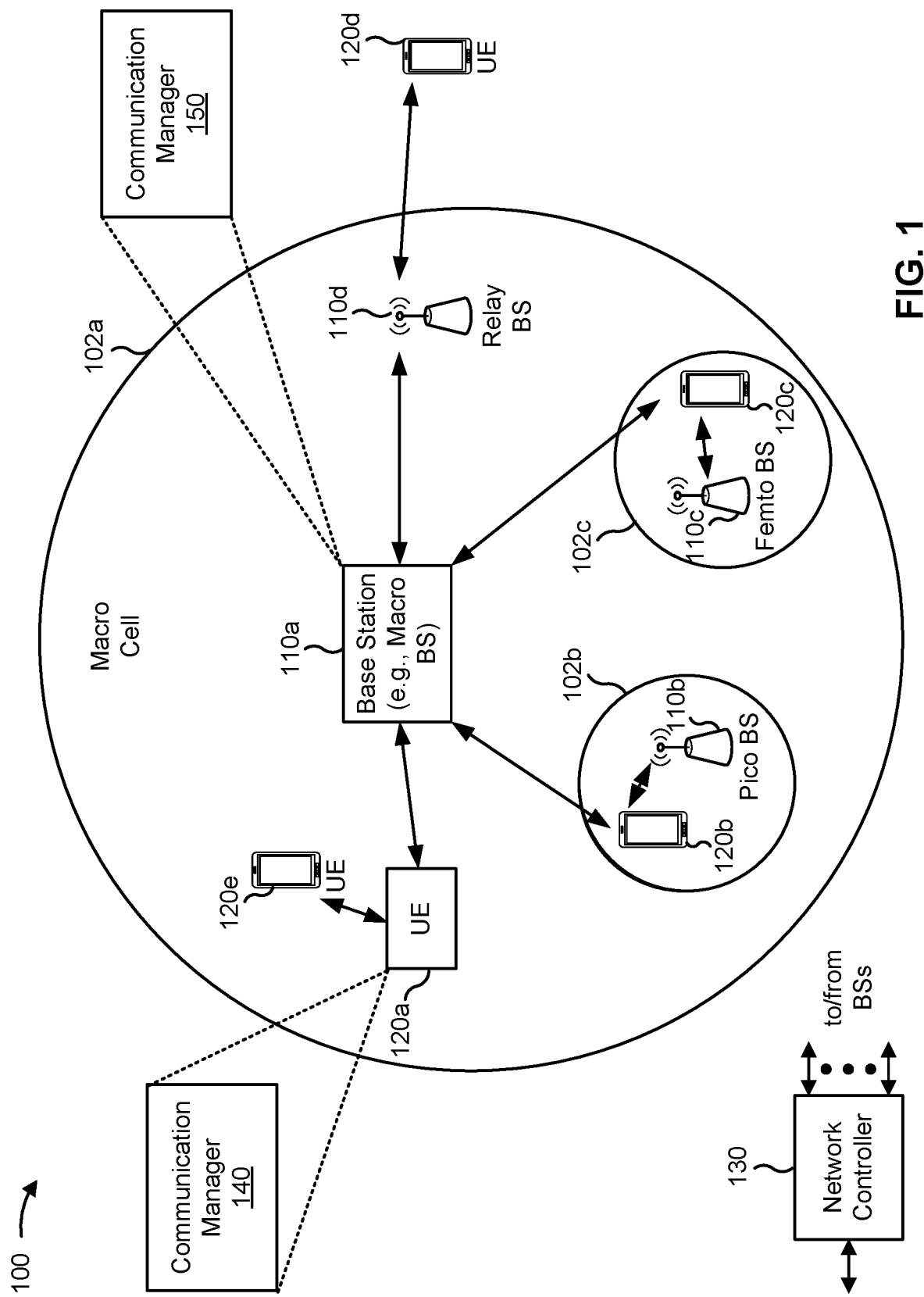
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from another wireless communication device, an indication of an averaging parameter associated with a transmitter nonlinear model, and estimate the transmitter nonlinear model based at least in part on the indication of the averaging parameter associated with the transmitter nonlinear model. Additionally, or alternatively, the communication manager 140 may perform one or more other operations described herein.

In some aspects, the base station 110 may include a communication manager 150. As described in more detail elsewhere herein, the communication manager 150 may determine one or more coherency factors associated with a transmitter nonlinear model, and transmit, to another wireless communication device, an indication of an averaging parameter associated with the transmitter nonlinear model, wherein the indication of the averaging parameter associated with the transmitter nonlinear model is based at least in part on the one or more coherency factors associated with the transmitter nonlinear model. Additionally, or alternatively, the communication manager 150 may perform one or more other operations described herein.

As indicated above, FIG. 1 is provided as an example. Other examples may differ from what is described with regard to FIG. 1.

Figure 2:
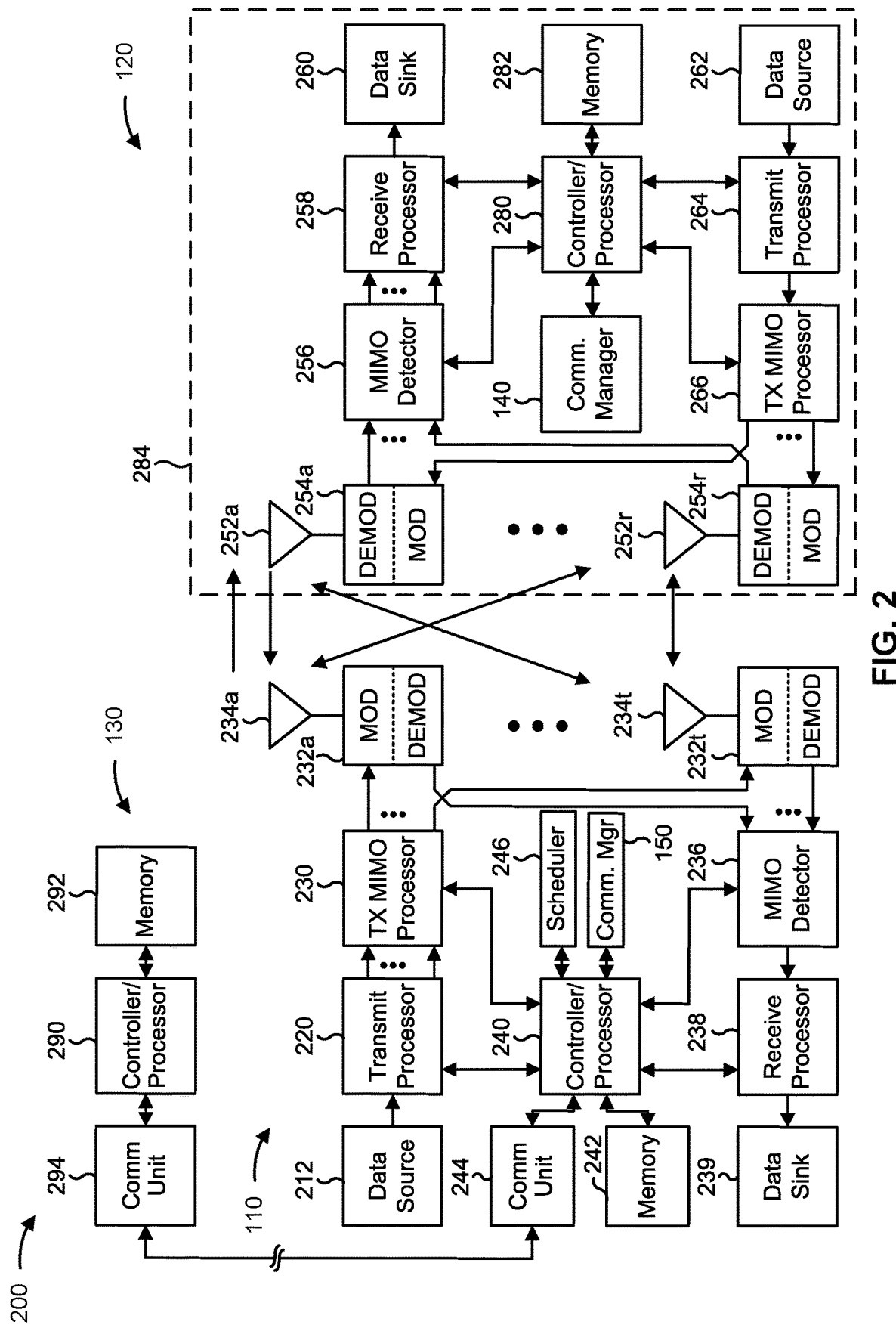
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with an indication of an averaging parameter associated with a transmitter nonlinear model, as described in more detail elsewhere herein. In some aspects, one or more of the wireless communication devices described herein is the base station 110, is included in the base station 110, or includes one or more components of the base station 110 shown in FIG. 2. In some aspects, one or more of the wireless communication devices described herein is the UE 120, is included in the UE 120, or includes one or more components of the UE 120 shown in FIG. 2. The controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving, from another wireless communication device, an indication of an averaging parameter associated with a transmitter nonlinear model, and/or means for estimating the transmitter nonlinear model based at least in part on the indication of the averaging parameter associated with the transmitter nonlinear model. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for determining one or more coherency factors associated with a transmitter nonlinear model, and/or means for transmitting, to another wireless communication device, an indication of an averaging parameter associated with the transmitter nonlinear model, wherein the indication of the averaging parameter associated with the transmitter nonlinear model is based at least in part on the one or more coherency factors associated with the transmitter nonlinear model. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
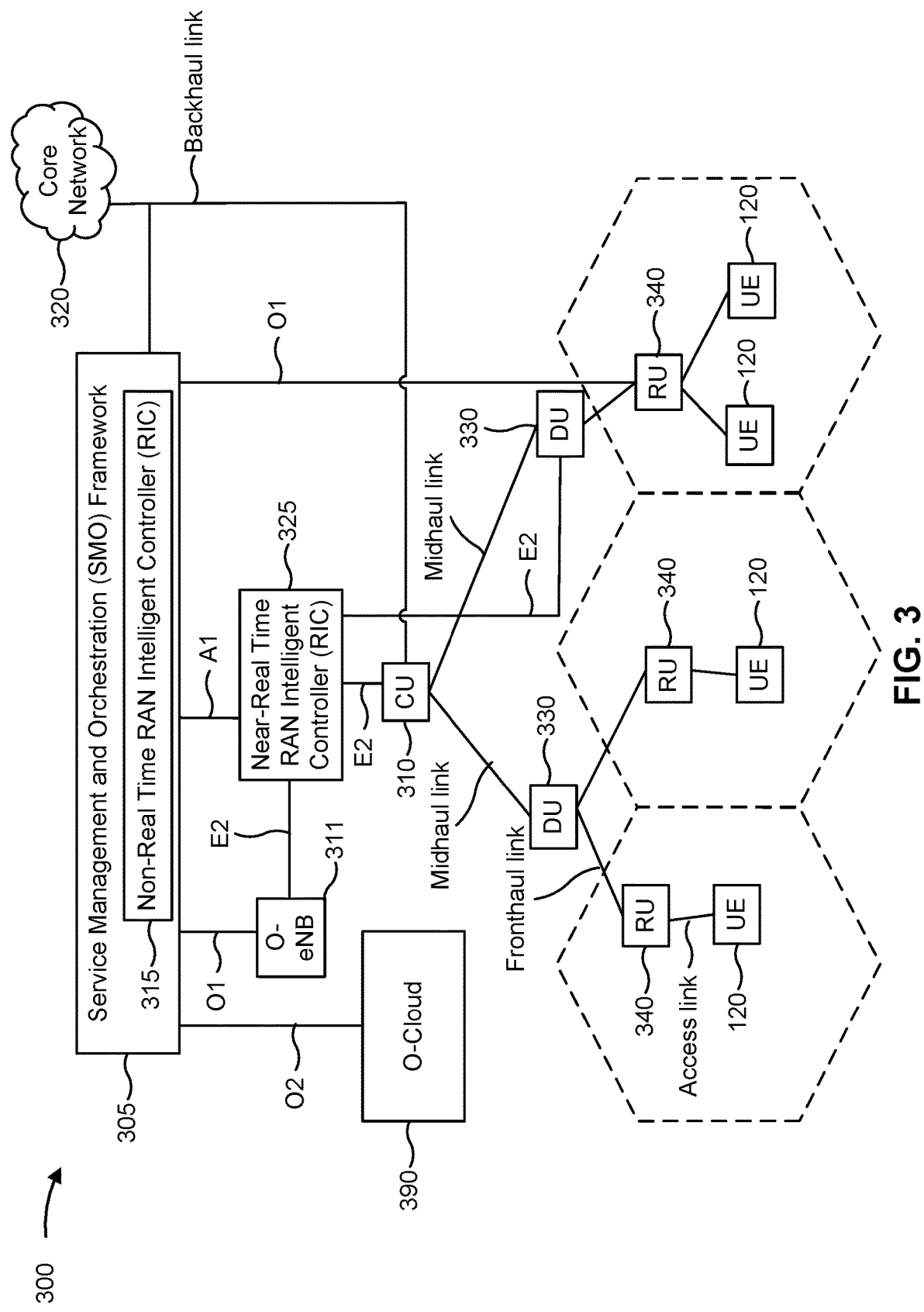
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)).

In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU). "Network entity" or "network node" can refer to a disaggregated base station, or to one or more units of a disaggregated base station (such as one or more CUs, one or more DUs, one or more RUs, or a combination thereof). "Network entity" or "network node" can refer to a disaggregated base station, or to one or more units of a disaggregated base station (such as one or more CUs, one or more DUs, one or more RUs, or a combination thereof).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
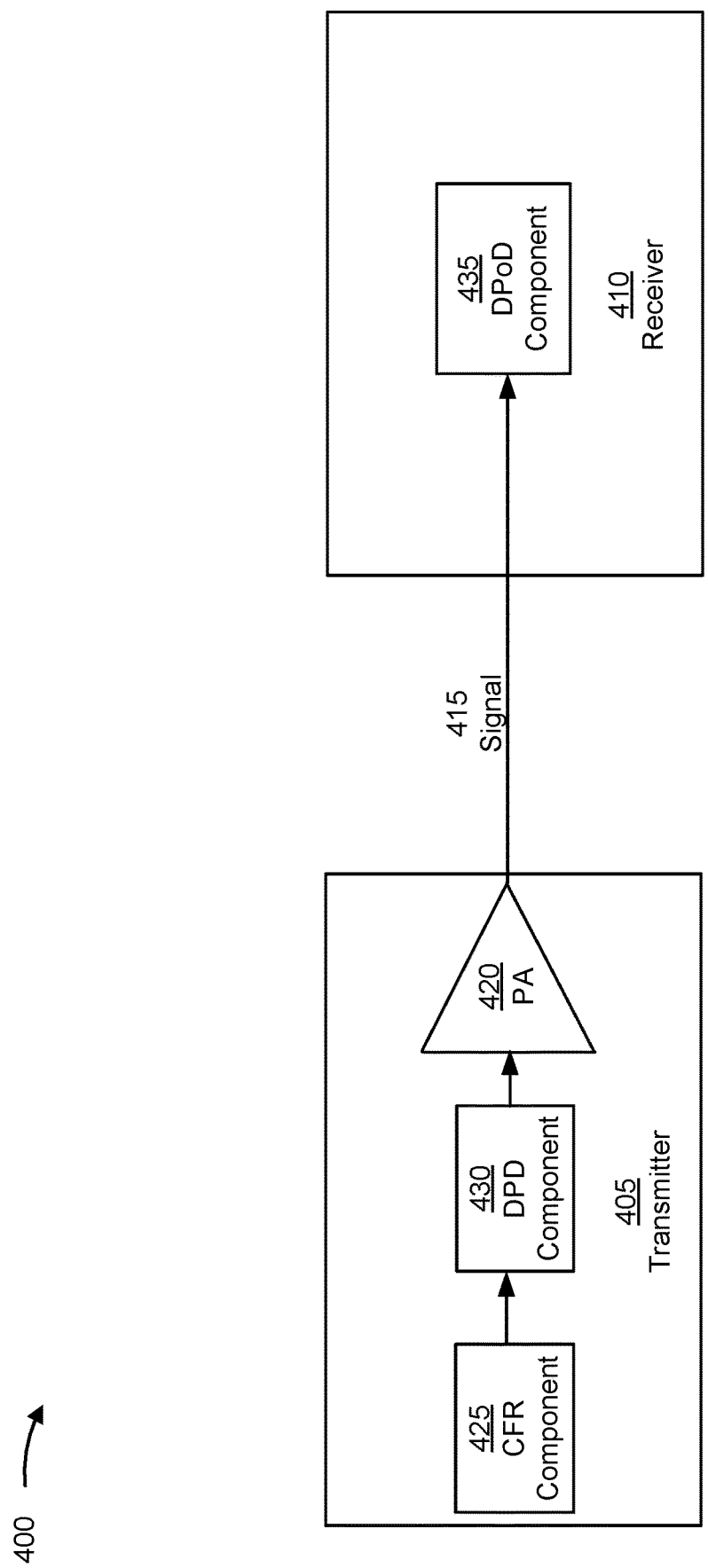
FIG. 4 is a diagram illustrating an example of components for pre-processing and post-processing a signal, in accordance with the present disclosure.

FIG. 4 is a diagram illustrating an example 400 of components for pre-processing and post-processing a signal, in accordance with the present disclosure. As shown in FIG. 4, a transmitter 405 may be in communication with a receiver 410. The transmitter 405 and the receiver 410 may be any of the wireless communication devices described herein (e.g., a UE 120, a base station 110, a CU 310, a DU 330, an RU 340, or the like), or may be located at any of the wireless communication devices described herein.

As shown, the transmitter 405 may communicate with the receiver 410, and, more particularly, the transmitter 405 may send a signal 415 to the receiver 410. The signal 415 may be pre-processed by the transmitter 405 to, among other benefits, compress a peak to average power ratio (PAPR) associated with the signal in order to reduce a power-back off value associated with transmission of the signal 415 to the receiver 410.

More particularly, in some communications systems, the transmitter 405 may include nonlinear components, such as a power amplifier (PA) 420 (which, in some aspects, may be a high-power amplifier) with a limited dynamic range that may distort a transmitted signal as a result of a relatively high PAPR. The nonlinear distortion may be an in-band distortion, which affects link performance in connection with mutual information and/or an error vector magnitude (EVM) amount, or an out-band distortion, which causes adjacent channel interference (ACI) and/or results in a high adjacent channel leakage ratio (ACLR) (e.g., the transmitted signal interferes with other signals on neighboring frequency bands, with the ACI and/or ACLR indicating how much the adjacent channel is polluted by a main transmission). To avoid nonlinearity distortions and accompanying interference, the transmitter 405 may apply a power back-off value to reduce transmit power, thereby reducing nonlinearity.

However, applying a power back-off value may result in reduced power efficiency (e.g., less available transmit power is used to transmit in a channel, thereby reducing range, signal to interference noise ratio, and/or the like). Put another way, less power from the transmitter 405 is transmitted to the channel, with more power dissipated as heat, resulting in reduced power efficiency. Accordingly, the transmitter 405 may use one or more pre-processing techniques to reduce the power back-off value. For example, the transmitter may utilize crest factor reduction (CFR) processing and/or digital pre-distortion (DPD) processing in a decision feedback equalizer (DFE) to reduce distortion. CFR processing may reduce the dynamic range of the signal, while DPD processing may reduce nonlinear distortion to less than a threshold level with a reduced level of power back-off, thereby increasing power efficiency relative to avoiding nonlinear distortion using only a power back-off. As shown in FIG. 4, the transmitter 405 may thus include a CFR component 425 for performing CFR processing to the signal 415 (e.g., to reduce PAPR in the signal 415 as much as possible and thus reduce the power back-off value), and/or the transmitter 405 may include a DPD component 430 for performing DPD processing to the signal 415 (e.g., to linearize the power amplifier's response).

However, CFR processing consumes additional resources (e.g., bandwidth resources, power resources, computational resources, or the like), and, in some cases, CFR processing may introduce in-band distortion (e.g., EVM distortion) and/or out-band distortion (e.g., ACI distortion). Moreover, although DPD processing may correct an in-dynamic-range nonlinearity effect, nonlinearity may still cause a clipping effect (e.g., resulting from the limited dynamic range). Thus, the effectiveness and/or power efficiency benefit of CFR processing and DPD processing are limited.

To account for limitations of CFR and/or DPD processing, the receiver 410 may apply digital post-distortion (DPoD) processing to the signal 415. DPoD processing may be similar to DPD processing but is performed in the receiver 410 rather than in the transmitter 405, and may be directed to processing for only EVM instead of processing for both EVM and ACI. More particularly, DPoD processing may be performed by a DPoD component 435 at the receiver 410, which may include hardware and/or software configured to implement an algorithm configured to remove nonlinear noise that is generated by a known model (e.g., PA clipping). DPoD processing thus may allow for reduced power back-out values and greater power efficiency.

In order to implement DPoD processing, the receiver 410 (and, more particularly, the DPoD component 435 at the receiver 410) may estimate certain nonlinear characteristics of the channel in which the signal 415 is transmitted. In some aspects, the receiver 410 and/or the DPoD component 435 may do so by estimating the nonlinearity associated with the transmitter (e.g., the nonlinearity associated with the digital pre-processing components and/or the nonlinearity associated with the power amplifier 420). More particularly, the receiver 410 and/or the DPoD component 435 may derive a transmitter nonlinear model from reference signaling (e.g., a DMRS symbol) received from the transmitter 405, and/or the receiver 410 and/or the DPoD component 435 may derive the transmitter nonlinear model from partial parameters signaled to the receiver 410 by the transmitter 405 via a dedicated channel or the like.

In either case, the receiver 410 and/or the DPoD component 435 may estimate the transmitter nonlinear model per slot, such as by using a DMRS for a given slot and/or physical resource block (PRB) allocation. Such an approach may not effectively estimate the transmitter nonlinear model under certain conditions, however. For example, if a signal-to-noise ratio (SNR) is not large enough in the channel and/or if there is not enough processing gain in the channel due to a small PRB allocation, the receiver 410 and/or the DPoD component 435 at the receiver 410 may not effectively estimate the transmitter nonlinear model using the single-slot measurements, resulting in poor link quality, increased latency, reduced throughput, and even link failure.

Some techniques and apparatuses described herein enable averaging certain parameters associated with a transmitter nonlinear model over two or more slots. More particularly, in some aspects, a first wireless communication device (which may be a transmitter (e.g., transmitter 405), may be associated with a transmitter, or may include a transmitter) may measure or otherwise determine certain coherency factors associated with a channel (such as a channel used to transmit the signal 415) and/or certain coherency factors associated with a transmitter nonlinear model. In some aspects, the coherency factors may be indicative of whether the transmitter nonlinear model is relatively static over a number of slots (e.g., over two or more slots). In some aspects, the coherency factors may include a temperature of the transmitter or one or more components thereof, an age of the transmitter or one or more components thereof and/or ambient conditions that may affect aging of the transmitter components, whether the transmitter is within a warmup period, a power at which a signal is being transmitted, a beam used to transmit a signal, a type of digital pre-processing used on the signal, and similar coherency factors. Based at least in part on the coherency factors (e.g., based at least in part on whether the coherency factors remain static over two or more slots), the first wireless communication device may signal an averaging parameter to a second wireless communication device (which may be a receiver (e.g., receiver 410), may be associated with a receiver, or may include a receiver). In some aspects, the averaging parameter may indicate whether the second wireless communication device is permitted to average, over two or more slots, one or more parameters associated with the transmitter nonlinear model, while, in some other aspects, the averaging parameter may indicate a number of slots over which the second wireless communication device is permitted to average one or more parameters associated with the transmitter nonlinear model. In this regard, the second wireless communication device may derive a robust transmitter nonlinear model over two or more slots and thus improve signal digital post-processing or the like, resulting in improved link quality, decreased latency, increased throughput, and more reliable wireless communications.

As indicated above, FIG. 4 is provided as an example. Other examples may differ from what is described with respect to FIG. 4.

Figure 5:
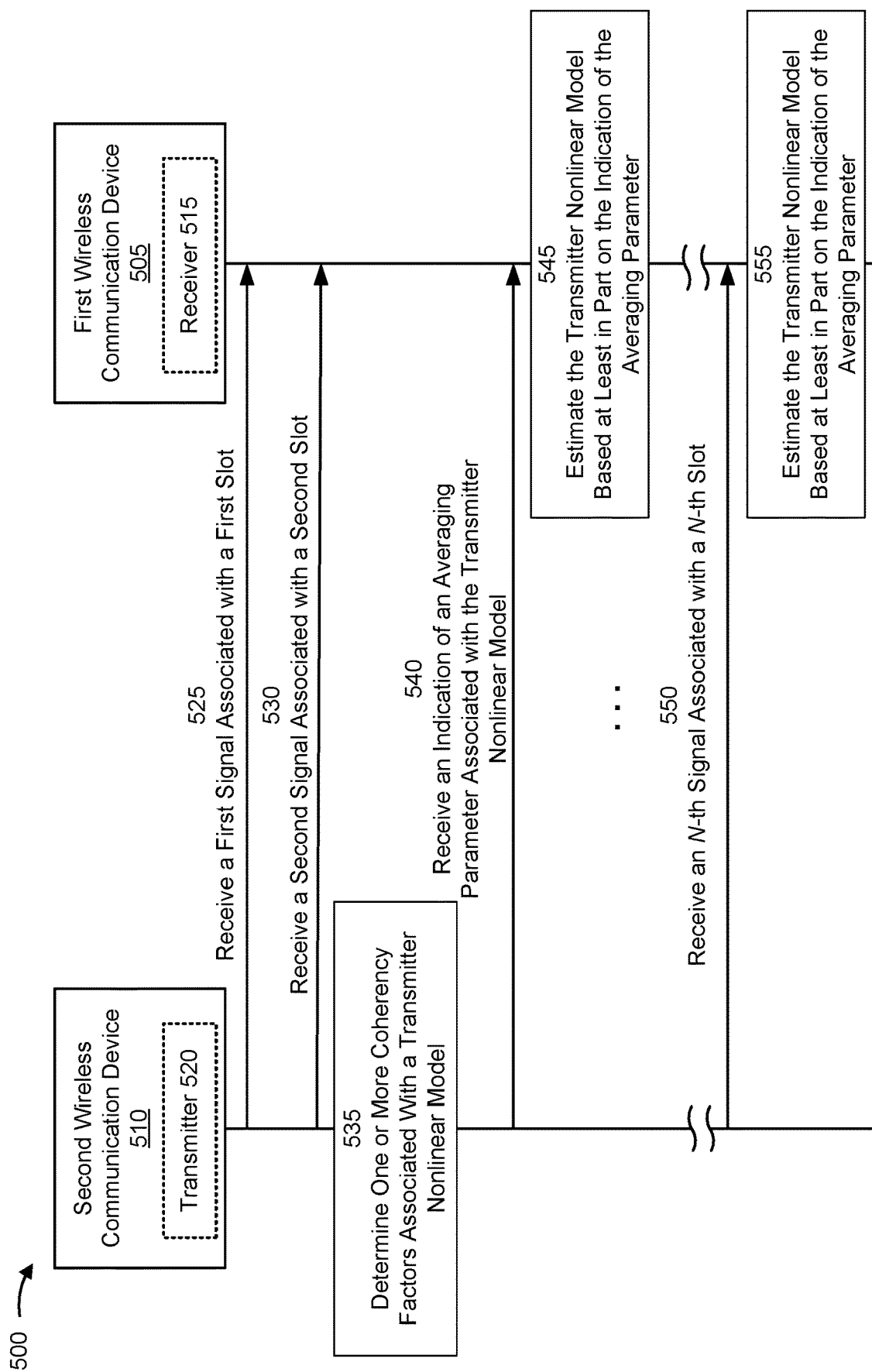
FIG. 5 is a diagram illustrating an example associated with an indication of an averaging parameter associated with a transmitter nonlinear model, in accordance with the present disclosure.

FIG. 5 is a diagram illustrating an example 500 associated with an indication of an averaging parameter associated with a transmitter nonlinear model, in accordance with the present disclosure. As shown in FIG. 5, a first wireless communication device 505 and a second wireless communication device 510 may communicate with one another. The first wireless communication device 505 and the second wireless communication device 510 may correspond to any of the wireless communication devices and/or network entities described herein, such as a UE 120, a base station 110, a CU 310, a DU 330, or an RU 340. Additionally, or alternatively, in some aspects, the first wireless communication device 505 may be a receiver 515 (e.g., receiver 410), may be associated with the receiver 515, or may include the receiver 515, and the second wireless communication device 510 may be a transmitter 520 (e.g., the transmitter 405), may be associated with the transmitter 520, or may include the transmitter 520.

As shown by reference number 525, the first wireless communication device 505 may receive, from the second wireless communication device 510, a first signal (e.g., the signal 415) associated with a first slot. In some aspects, the second wireless communication device 510 and/or the transmitter 520 may digitally pre-process the first signal using a CFR component (e.g., the CFR component 425), a DPD component (e.g., the DPD component 430), or another digital pre-processing component. Additionally, or alternatively, the second wireless communication device 510 and/or the transmitter 520 may amplify the first signal using a power amplifier or the like, such as the power amplifier 420 described in connection with FIG. 4. As described, digital pre-processing and/or power amplification techniques may beneficially reduce a power backoff value, resulting in increased power efficiency, but may introduce nonlinear distortion into the first signal, which thus may need to be accounted for during digital post-processing of the first signal or otherwise.

In some aspects, the first wireless communication device 505 may receive one or more additional signals from the second wireless communication device 510, each associated with a respective slot. For example, as shown by reference number 530, the first wireless communication device 505 may receive, from the second wireless communication device 510, a second signal associated with a second slot. As with the first signal described in connection with reference number 525, the second wireless communication device 510 and/or the transmitter 520 may digitally pre-process the second signal using a CFR component (e.g., the CFR component 425), a DPD component (e.g., the DPD component 430), or a similar digital pre-processing component, and/or the second wireless communication device 510 and/or the transmitter 520 may amplify the signal using a power amplifier (e.g., the power amplifier 420), introducing nonlinear distortion into the signal.

In some aspects, one or both of the first and second signals described in connection with reference numbers 525 and 530, respectively, may include reference signaling (e.g., a DMRS) for purposes of deriving a transmitter nonlinear model (e.g., for purposes of estimating nonlinear distortion of the signal due to the digital pre-processing, power amplification, or other processes performed by the transmitter 520). More particularly, the first signal may include a first DMRS for purposes of deriving the transmitter nonlinear model during the first slot, and the second signal may include a second DMRS for purposes of deriving the transmitter nonlinear model during the second slot.

However, in some aspects, the SNR in the channel during the first slot and/or the second slot may not be large enough to adequately derive the transmitter nonlinear model, and/or there may not be adequate processing gain associated with the DMRS to adequately derive the transmitter nonlinear model due to a small PRB allocation for the DMRS or the like. Accordingly, in some aspects, it may be beneficial for the first wireless communication device 505 to average one or more parameters associated with the transmitter nonlinear model over more than one slot (e.g., over the first slot and the second slot) to derive a more robust transmitter nonlinear model. For example, in some aspects, the transmitter nonlinear model may be based at least in part on a nonlinear function, and, more particularly, the transmitter nonlinear model may be based at least in part on a polynomial function including a number (e.g., d) of discrete terms, sometimes referred to as kernels, with each term including a corresponding coefficient, $\alpha_d$. In some aspects, the first wireless communication device 505 and/or the receiver 515 may derive the coefficients, $\alpha_d$, associated with each kernel for each slot such that the polynomial function most closely represents the transmitter nonlinear model for the given slot. However, when the SNR in the channel during the respective slot is not large enough to adequately derive the coefficients, $\alpha_d$, associated with each kernel, and/or when, due to a small PRB allocation for the DMRS, there is not adequate processing gain associated with the DMRS to adequately derive the coefficients, $\alpha_d$, associated with each kernel, it may be beneficial for the first wireless communication device 505 to average derived coefficients, $\alpha_d$, associated with each kernel and/or other parameters associated with the transmitter nonlinear model over two or more slots.

However, averaging derived coefficients, $\alpha_d$, associated with each kernel and/or other parameters associated with the transmitter nonlinear model over two or more slots may accurately represent nonlinearity only if the transmitter nonlinear model is relatively static (e.g., when there is a high coherency between the transmitter nonlinear model across multiple slots). Thus, as shown by reference number 535, in some aspects the second wireless communication device 510 may determine one or more coherency factors associated with the transmitter nonlinear model. Put another way, the second wireless communication device 510 may monitor, measure, or otherwise determine certain factors which may affect the coherency of the transmitter nonlinear model from slot to slot. If, in the determination indicated by reference number 535, the second wireless communication device 510 determines that factors that may affect the first wireless communication device 505's estimation of the transmitter nonlinear model are relatively static, the second wireless communication device 510 may indicate to the first wireless communication device 505 that certain parameters associated with the transmitter nonlinear model may be averaged over two or more slots. However, if, in the determination indicated by reference number 535, the second wireless communication device 510 determines that factors that may affect the first wireless communication device 505's estimation of the transmitter nonlinear model are not static, the second wireless communication device 510 may indicate to the first wireless communication device 505 that certain parameters associated with the transmitter nonlinear model should not be averaged over two or more slots.

The coherency factors measured, monitored, or otherwise determined by the second wireless communication device 510 may be factors that affect the coherency of the transmitter nonlinear model from one slot to another slot. For example, the second wireless communication device 510 may determine a temperature of the transmitter 520 during transmissions in each slot, may determine a relative age of components (e.g., microchips or the like) within the transmitter 520 and/or external factors (e.g., ambient temperature or the like) that may affect aging of the transmitter 520 components, may determine whether the transmitter 520 is in a warmup period in each slot, may determine a power used to transmit the signal in each slot, may determine a bandwidth used to transmit the signal in each slot, may determine a beam used to transmit each signal, may determine a type of digital pre-processing used for each signal, and/or may determine other similar coherency factors. If the coherency factors are relatively static from slot to slot (e.g., if the temperature of the transmitter 520 is relatively static from slot to slot, if the age of the components associated with the transmitter 520 and/or external factors affecting aging of the components are relatively static from slot to slot, if a warmup-period status of the transmitter 520 is static from slot to slot, if a power level used to transmit signals is static from slot to slot, if a bandwidth used to transmit signals is static from slot to slot, if the same beam is used to transmit signals from slot to slot, and/or if the same digital pre-processing technique is used from slot to slot) the second wireless communication device 510 may determine that the transmitter nonlinear model is relatively coherent and/or that the first wireless communication device 505 is permitted to average parameters associated with the transmitter nonlinear model over two or more slots. In contrast, if the coherency factors are not relatively static from slot to slot (e.g., if the temperature of the transmitter 520 differs from slot to slot, if the age of the components associated with the transmitter 520 and/or external factors affecting aging of the components differ from slot to slot, if a warmup-period status of the transmitter 520 differs from slot to slot, if a power level used to transmit signals differs from slot to slot, if a bandwidth used to transmit signals differs from slot to slot, if different beams are used to transmit signals from slot to slot, and/or if different digital pre-processing techniques are used from slot to slot) the second wireless communication device 510 may determine that the transmitter nonlinear model is not coherent and/or that the first wireless communication device 505 should not average parameters associated with the transmitter nonlinear model over two or more slots.

As shown by reference number 540, the second wireless communication device 510 may signal to the first wireless communication device 505 whether or not averaging is permitted over two or more slots. More particularly, in some aspects, the first wireless communication device 505 may receive, from the second wireless communication device 510, an indication of an averaging parameter associated with the transmitter nonlinear model. The indication of the averaging parameter associated with the transmitter nonlinear model may be received, by the first wireless communication device 505, via layer 1, layer 2, or layer 3 signaling, or the like. For example, in aspects in which the indication of the averaging parameter associated with the transmitter nonlinear model is received via an uplink communication (e.g., in aspects in which the first wireless communication device 505 is associated with a base station 110, a CU 310, a DU 330, an RU 340, or a similar network entity, and the second wireless communication device 510 is associated with a UE 120), the uplink communication may be one of a physical uplink control channel (PUCCH) communication, a MAC control element (MAC-CE) communication, or an RRC communication. In aspects in which the indication of the averaging parameter associated with the transmitter nonlinear model is received via a downlink communication (e.g., in aspects in which the first wireless communication device 505 is associated with a UE 120 and the second wireless communication device 510 is associated with one of a base station 110, a CU 310, a DU 330, an RU 340, or a similar network entity), the downlink communication may be one of a downlink control information (DCI) communication, a MAC-CE communication, or an RRC communication.

In some aspects, the indication of the averaging parameter associated with the transmitter nonlinear model includes an indication of whether the first wireless communication device 505 is permitted to average, over two or more slots, one or more parameters (e.g., the coefficients, $\alpha_d$, associated with each kernel of a polynomial function and/or similar parameters) associated with the transmitter nonlinear model. Moreover, the indication of whether the first wireless communication device 505 is permitted to average, over the two or more slots, the one or more parameters associated with the transmitter nonlinear model may be provided using a single bit (e.g., one of an information bit 0 or 1 when averaging is permitted, and the other one of the information bit 0 or 1 when averaging is not permitted). Accordingly, as shown by reference number 545, the first wireless communication device 505 may estimate the transmitter nonlinear model based at least in part on the indication of the averaging parameter associated with the transmitter nonlinear model. More particularly, the first wireless communication device 505 may average, over two or more slots (e.g., the slots described in connection with reference numbers 525 and 530), one or more parameters (e.g., the coefficients, $\alpha_d$, associated with each kernel of a polynomial function and/or similar parameters) associated with the transmitter nonlinear model.

In contrast, when the second wireless communication device 510 determines that the transmitter nonlinear model is not static, the indication of the averaging parameter associated with the transmitter nonlinear model may indicate that the first wireless communication device 505 is not permitted to average, over two or more slots, one or more parameters associated with the transmitter nonlinear model. Accordingly, in the estimation step shown by reference number 545 for this example, the first wireless communication device 505 may not average the one or more parameters (e.g., the coefficients, $\alpha_d$, associated with each kernel of a polynomial function and/or similar parameters) associated with the transmitter nonlinear model, but instead may estimate the transmitter nonlinear model on a slot-by-slot basis, due to the non-coherency of the transmitter nonlinear model.

In some other aspects, the indication of the averaging parameter associated with the transmitter nonlinear model includes an indication of a number of slots over which the first wireless communication device 505 is permitted to average one or more parameters (e.g., the coefficients, $\alpha_d$, associated with each kernel of a polynomial function and/or similar parameters) associated with the transmitter nonlinear model. More particularly, when the coherency of the transmitter nonlinear model is relatively static and/or when the second wireless communication device 510 determines that the transmitter nonlinear model is not likely to quickly change, the number of slots may be an infinite number of slots (e.g., the indication may indicate that the first wireless communication device 505 is permitted to average parameters associated with the transmitter nonlinear model for an indefinite period of time). That is, the indication may indicate that the first wireless communication device is permitted to average one or more parameters associated with the transmitter nonlinear model and continue to do so until the first wireless communication device 505 receives an indication from second wireless communication device 510 that averaging is no longer permitted. In some other aspects, the number of slots may be a finite number of slots, such as N slots (e.g., the indication may indicate that the first wireless communication device 505 is permitted to average parameters associated with the transmitter nonlinear model for a defined period of time). For example, in aspects in which the coherency of the transmitter nonlinear model is relatively static but the second wireless communication device 510 determines that the transmitter nonlinear model may change in a number of slots (e.g., the transmitter nonlinear model may no longer be coherent after N slots), the second wireless communication device 510 may signal to the first wireless communication device 505 that averaging is permitted for N slots.

Accordingly, as shown by reference numbers 545, 550, and 555, the first wireless communication device 505 may estimate the transmitter nonlinear model based at least in part on the indication of the averaging parameter associated with the transmitter nonlinear model over multiple slots. More particularly, the first wireless communication device 505 may estimate the transmitter nonlinear model based at least in part averaging, over the first slot and the second slot, certain parameters associated with the transmitter nonlinear model. The first wireless communication device 505 may thereafter continue to receive signals and estimate the transmitter nonlinear model based at least in part on averaging one or more parameters.

For example, as indicated by reference number 550, the first wireless communication device 505 may receive, from the second wireless communication device 510, an N-th signal associated with an N-th slot. The N-th signal may include reference signaling (e.g., a DMRS) for purposes of estimating the transmitter nonlinear model during the N-th slot. Moreover, as indicated by reference number 555, the first wireless communication device 505 may estimate the transmitter nonlinear model based at least in part on the indication of the averaging parameter associated with the transmitter nonlinear model. This may include the first wireless communication device 505 estimating the transmitter nonlinear model based at least in part averaging, over the N-th slot and one or more previous slots (e.g., an (N−1)-th slot, an (N−2)-th slot, and/or additional slots) certain parameters associated with the transmitter nonlinear model, such as the coefficients, $\alpha_d$, associated with each kernel of a polynomial function and/or similar parameters.

In aspects in which the indication of the averaging parameter associated with the transmitter nonlinear model includes an indication of an infinite number of slots over which the first wireless communication device 505 is permitted to average one or more parameters, the first wireless communication device 505 may continue in this manner until it receives a subsequent indication from the second wireless communication device 510 indicating that the first wireless communication device 505 is no longer permitted to average one or more parameters associated with the transmitter nonlinear model. In aspects in which the indication of the averaging parameter associated with the transmitter nonlinear model includes an indication of a finite number of slots (e.g., N slots) over which the first wireless communication device 505 is permitted to average one or more parameters, following the N-th slot, the first wireless communication device 505 may return to single-slot nonlinear channel estimation until the first wireless communication device 505 receives a subsequent indication indicating that the first wireless communication device 505 is permitted to average one or more parameters associated with the transmitter nonlinear model.

As indicated above, FIG. 5 is provided as an example. Other examples may differ from what is described with respect to FIG. 5.

Figure 6:
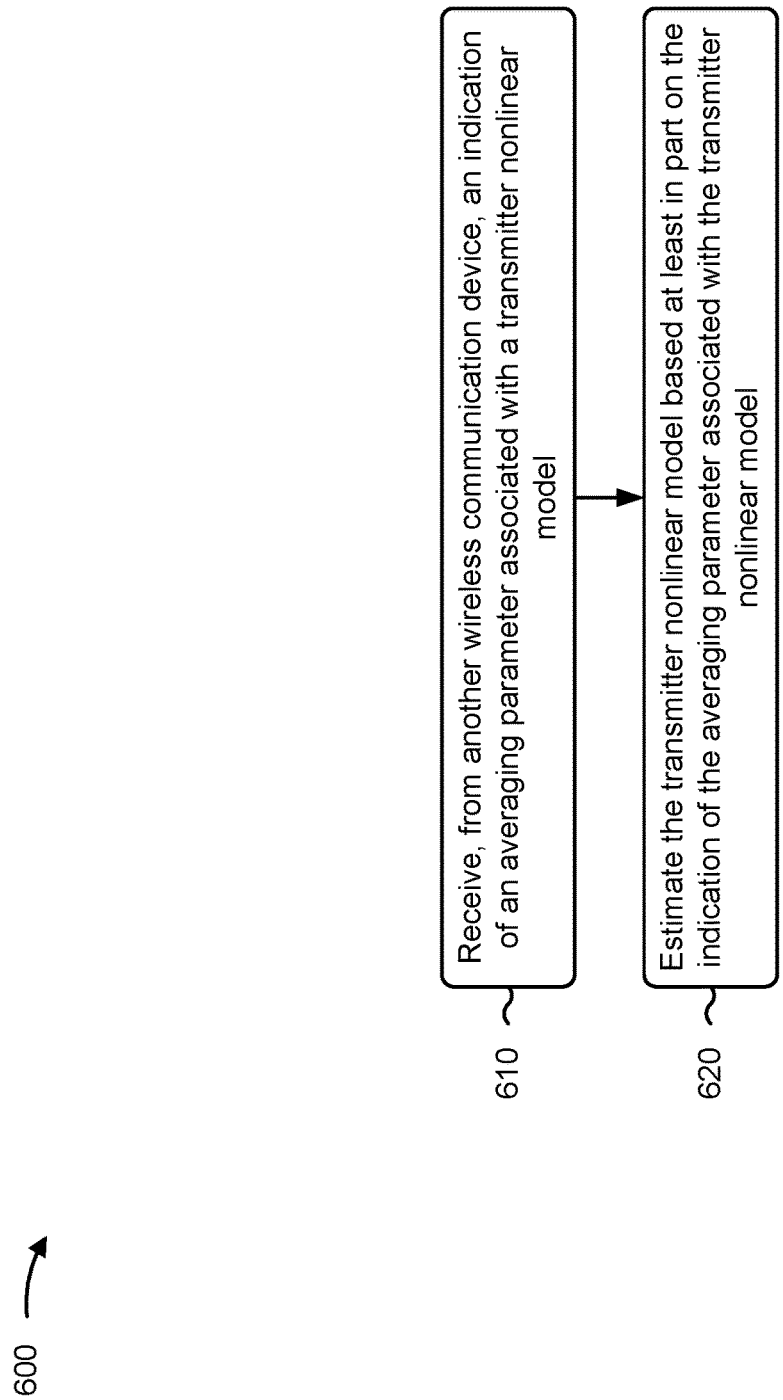
FIG. 6 is a diagram illustrating an example process performed, for example, by a wireless communication device, in accordance with the present disclosure.

FIG. 6 is a diagram illustrating an example process 600 performed, for example, by a wireless communication device, in accordance with the present disclosure. Example process 600 is an example where the wireless communication device (e.g., the first wireless communication device 505) performs operations associated with an indication of an averaging parameter associated with a transmitter nonlinear model.

As shown in FIG. 6, in some aspects, process 600 may include receiving, from another wireless communication device, an indication of an averaging parameter associated with a transmitter nonlinear model (block 610). For example, the wireless communication device (e.g., using communication manager 808 and/or reception component 802, depicted in FIG. 8) may receive, from another wireless communication device, an indication of an averaging parameter associated with a transmitter nonlinear model, as described above.

As further shown in FIG. 6, in some aspects, process 600 may include estimating the transmitter nonlinear model based at least in part on the indication of the averaging parameter associated with the transmitter nonlinear model (block 620). For example, the wireless communication device (e.g., using communication manager 808 and/or nonlinear estimation component 810, depicted in FIG. 8) may estimate the transmitter nonlinear model based at least in part on the indication of the averaging parameter associated with the transmitter nonlinear model, as described above.

Process 600 may include additional aspects, such as any single aspect or any combination of aspects described below and/or in connection with one or more other processes described elsewhere herein.

In a first aspect, the indication of the averaging parameter associated with the transmitter nonlinear model includes an indication of whether the wireless communication device is permitted to average, over two or more slots, one or more parameters associated with the transmitter nonlinear model.

In a second aspect, alone or in combination with the first aspect, the indication of whether the wireless communication device is permitted to average, over the two or more slots, the one or more parameters associated with the transmitter nonlinear model is indicated using one bit.

In a third aspect, alone or in combination with one or more of the first and second aspects, the indication of the averaging parameter associated with the transmitter nonlinear model includes an indication of a number of slots over which the wireless communication device is permitted to average one or more parameters associated with the transmitter nonlinear model.

In a fourth aspect, alone or in combination with one or more of the first through third aspects, the number of slots over which the wireless communication device is permitted to average the one or more parameters associated with the transmitter nonlinear model is an infinite number of slots.

In a fifth aspect, alone or in combination with one or more of the first through fourth aspects, the number of slots over which the wireless communication device is permitted to average the one or more parameters associated with the transmitter nonlinear model is a finite number of slots.

In a sixth aspect, alone or in combination with one or more of the first through fifth aspects, the indication of the averaging parameter associated with the transmitter nonlinear model is received via an uplink communication, and the uplink communication is one of a PUCCH communication, a MAC-CE communication, or an RRC communication.

In a seventh aspect, alone or in combination with one or more of the first through sixth aspects, the indication of the averaging parameter associated with the transmitter nonlinear model is received via a downlink communication, and the downlink communication is one of a DCI communication, a MAC-CE communication, or an RRC communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
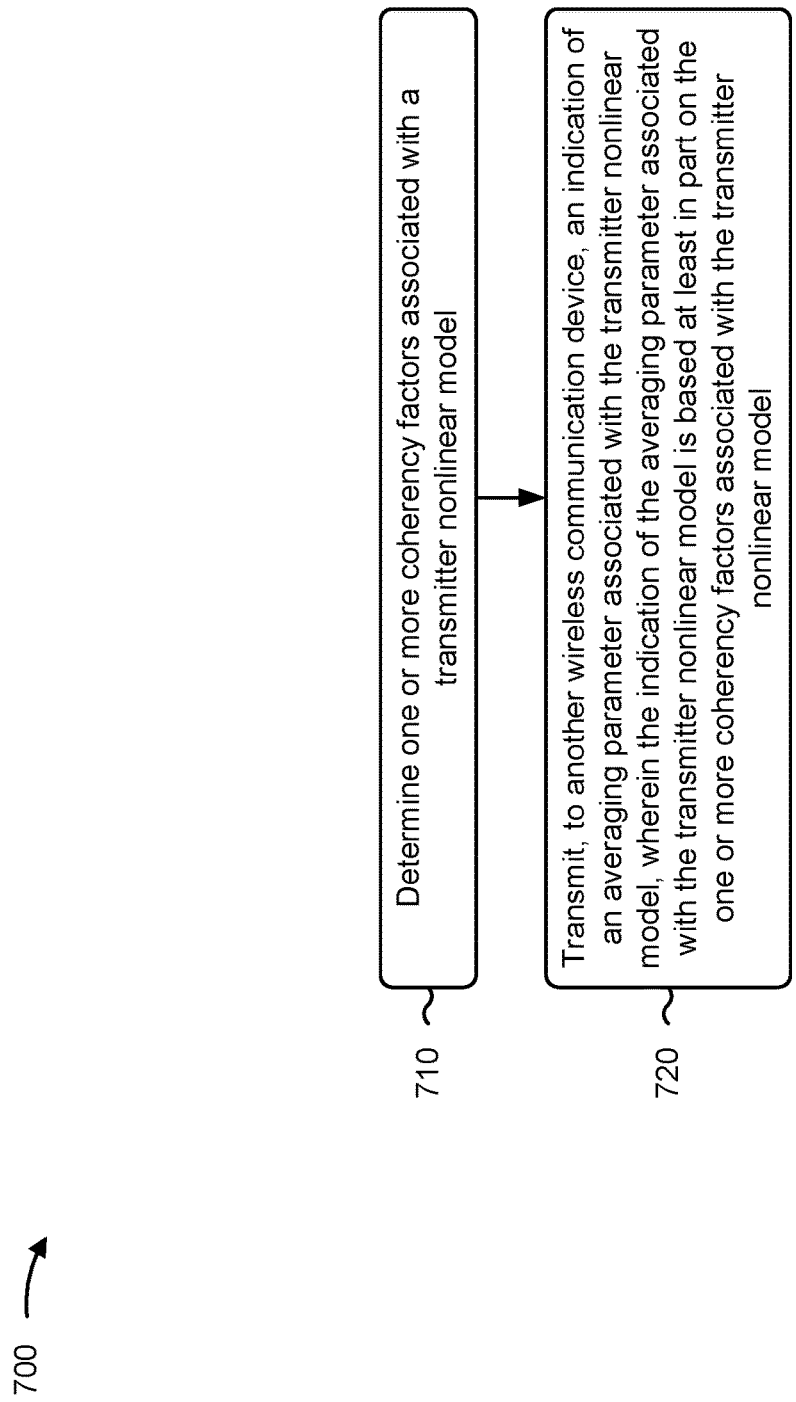
FIG. 7 is a diagram illustrating an example process performed, for example, by a wireless communication device, in accordance with the present disclosure.

FIG. 7 is a diagram illustrating an example process 700 performed, for example, by a wireless communication device, in accordance with the present disclosure. Example process 700 is an example where the wireless communication device (e.g., the second wireless communication device 510) performs operations associated with indication of an averaging parameter associated with a transmitter nonlinear model.

As shown in FIG. 7, in some aspects, process 700 may include determining one or more coherency factors associated with a transmitter nonlinear model (block 710). For example, the wireless communication device (e.g., using communication manager 908 and/or determination component 910, depicted in FIG. 9) may determine one or more coherency factors associated with a transmitter nonlinear model, as described above.

As further shown in FIG. 7, in some aspects, process 700 may include transmitting, to another wireless communication device, an indication of an averaging parameter associated with the transmitter nonlinear model, wherein the indication of the averaging parameter associated with the transmitter nonlinear model is based at least in part on the one or more coherency factors associated with the transmitter nonlinear model (block 720). For example, the wireless communication device (e.g., using communication manager 908 and/or transmission component 904, depicted in FIG. 9) may transmit, to another wireless communication device, an indication of an averaging parameter associated with the transmitter nonlinear model, wherein the indication of the averaging parameter associated with the transmitter nonlinear model is based at least in part on the one or more coherency factors associated with the transmitter nonlinear model, as described above.

Process 700 may include additional aspects, such as any single aspect or any combination of aspects described below and/or in connection with one or more other processes described elsewhere herein.

In a first aspect, the indication of the averaging parameter associated with the transmitter nonlinear model includes an indication of whether the other wireless communication device is permitted to average, over two or more slots, one or more parameters associated with the transmitter nonlinear model.

In a second aspect, alone or in combination with the first aspect, the indication of whether the other wireless communication device is permitted to average, over the two or more slots, the one or more parameters associated with the transmitter nonlinear model is indicated using one bit.

In a third aspect, alone or in combination with one or more of the first and second aspects, the indication of the averaging parameter associated with the transmitter nonlinear model includes an indication of a number of slots over which the other wireless communication device is permitted to average one or more parameters associated with the transmitter nonlinear model.

In a fourth aspect, alone or in combination with one or more of the first through third aspects, the number of slots over which the other wireless communication device is permitted to average the one or more parameters associated with the transmitter nonlinear model is an infinite number of slots.

In a fifth aspect, alone or in combination with one or more of the first through fourth aspects, the number of slots over which the other wireless communication device is permitted to average the one or more parameters associated with the transmitter nonlinear model is a finite number of slots.

In a sixth aspect, alone or in combination with one or more of the first through fifth aspects, the indication of the averaging parameter associated with the transmitter nonlinear model is transmitted via an uplink communication, and the uplink communication is one of a PUCCH communication, a MAC-CE communication, or an RRC communication.

In a seventh aspect, alone or in combination with one or more of the first through sixth aspects, the indication of the averaging parameter associated with the transmitter nonlinear model is transmitted via a downlink communication, and the downlink communication is one of a DCI communication, a MAC-CE communication, or an RRC communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
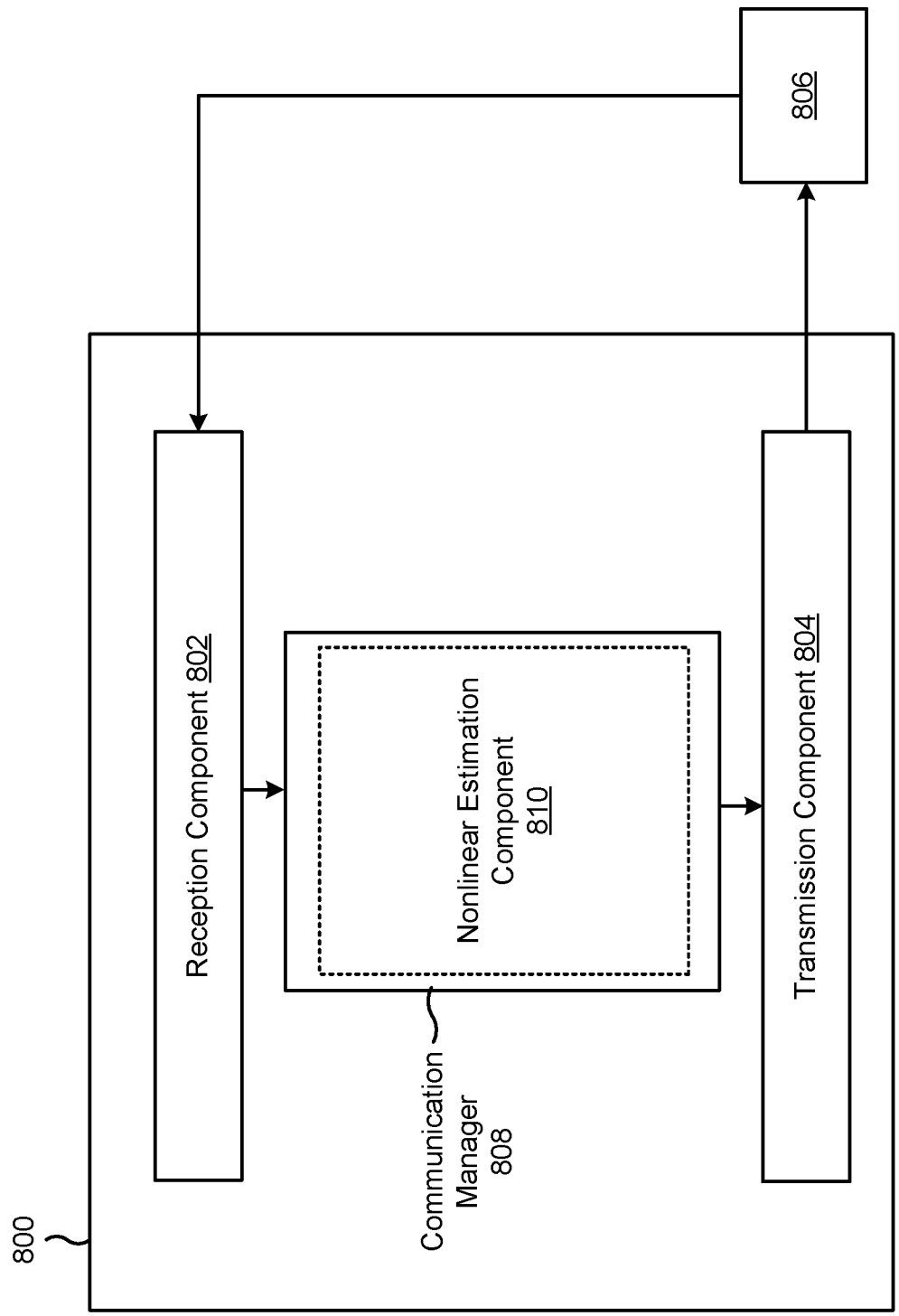
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a wireless communication device (e.g., the first wireless communication device 505), or a wireless communication device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 808 (e.g., communication manager 140, communication manager 150, or the like). The communication manager 808 may include a nonlinear estimation component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE 120 or the base station 110 described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE 120 and/or base station 110 described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE 120 and/or base station 110 described in connection with FIG. 2. In some aspects, the transmission component 804 may be co-located with the reception component 802 in a transceiver.

The reception component 802 may receive, from another wireless communication device, an indication of an averaging parameter associated with a transmitter nonlinear model. The nonlinear estimation component 810 may estimate the transmitter nonlinear model based at least in part on the indication of the averaging parameter associated with the transmitter nonlinear model.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
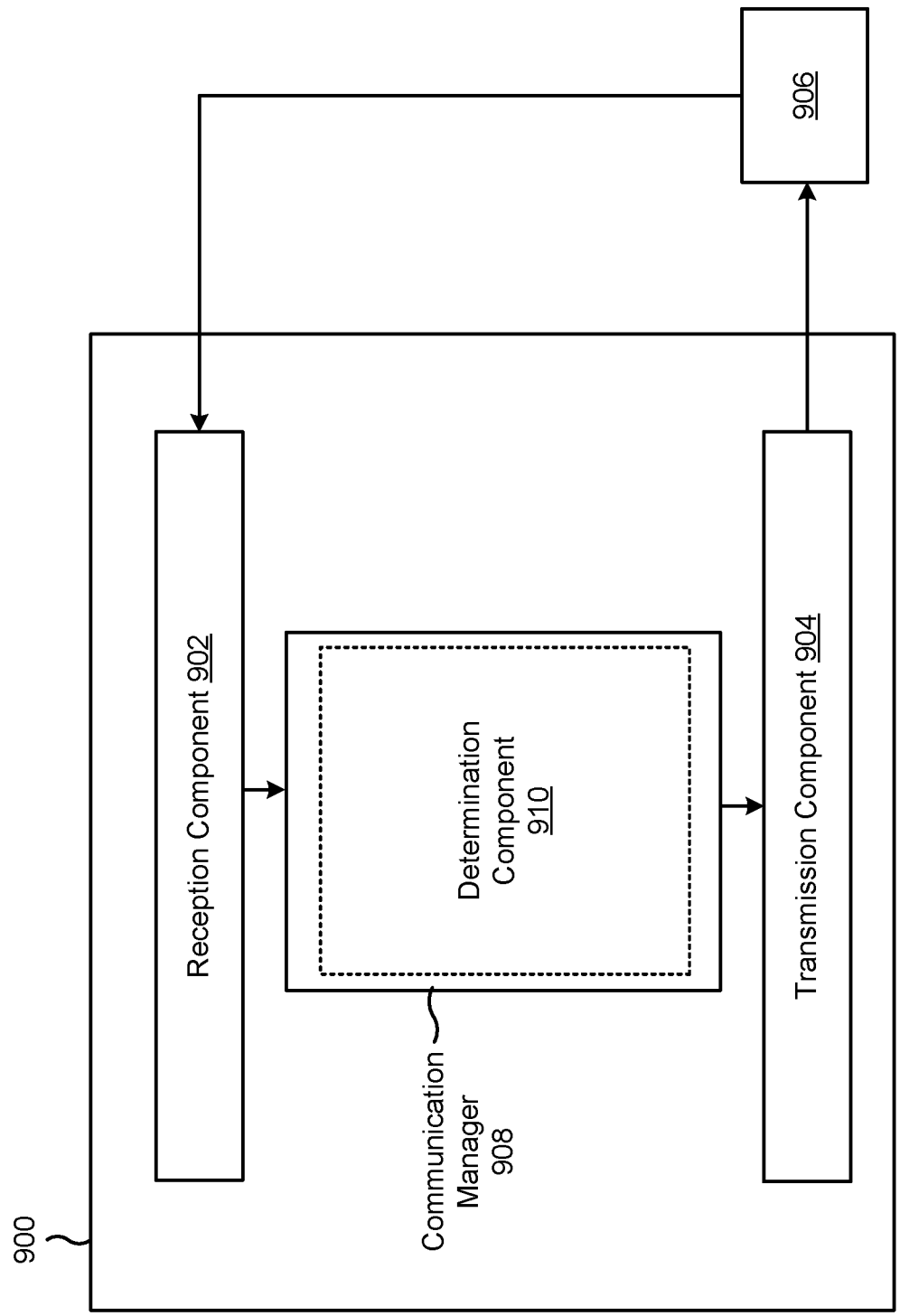
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a wireless communication device, or a wireless communication device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908 (e.g., communication manager 140, communication manager 150, or the like). The communication manager 908 may include a determination component 910, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE 120 and/or the base station 110 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE 120 and/or base station 110 described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE 120 and/or base station 110 described in connection with FIG. 2. In some aspects, the transmission component 904 may be co-located with the reception component 902 in a transceiver.

The determination component 910 may determine one or more coherency factors associated with a transmitter nonlinear model. The transmission component 904 may transmit, to another wireless communication device, an indication of an averaging parameter associated with the transmitter nonlinear model, wherein the indication of the averaging parameter associated with the transmitter nonlinear model is based at least in part on the one or more coherency factors associated with the transmitter nonlinear model.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a wireless communication device, comprising: receiving, from another wireless communication device, an indication of an averaging parameter associated with a transmitter nonlinear model; and estimating the transmitter nonlinear model based at least in part on the indication of the averaging parameter associated with the transmitter nonlinear model.

Aspect 2: The method of Aspect 1, wherein the indication of the averaging parameter associated with the transmitter nonlinear model includes an indication of whether the wireless communication device is permitted to average, over two or more slots, one or more parameters associated with the transmitter nonlinear model.

Aspect 3: The method of Aspect 2, wherein the indication of whether the wireless communication device is permitted to average, over the two or more slots, the one or more parameters associated with the transmitter nonlinear model is indicated using one bit.

Aspect 4: The method of any of Aspects 1-3, wherein the indication of the averaging parameter associated with the transmitter nonlinear model includes an indication of a number of slots over which the wireless communication device is permitted to average one or more parameters associated with the transmitter nonlinear model.

Aspect 5: The method of Aspect 4, wherein the number of slots over which the wireless communication device is permitted to average the one or more parameters associated with the transmitter nonlinear model is an infinite number of slots.

Aspect 6: The method of Aspect 4, wherein the number of slots over which the wireless communication device is permitted to average the one or more parameters associated with the transmitter nonlinear model is a finite number of slots.

Aspect 7: The method of any of Aspects 1-6, wherein the indication of the averaging parameter associated with the transmitter nonlinear model is received via an uplink communication, and wherein the uplink communication is one of a PUCCH communication, a MAC-CE communication, or an RRC communication.

Aspect 8: The method of any of Aspects 1-6, wherein the indication of the averaging parameter associated with the transmitter nonlinear model is received via a downlink communication, and wherein the downlink communication is one of a DCI communication, a MAC-CE communication, or an RRC communication.

Aspect 9: A method of wireless communication performed by a wireless communication device, comprising: determining one or more coherency factors associated with a transmitter nonlinear model; and transmitting, to another wireless communication device, an indication of an averaging parameter associated with the transmitter nonlinear model, wherein the indication of the averaging parameter associated with the transmitter nonlinear model is based at least in part on the one or more coherency factors associated with the transmitter nonlinear model.

Aspect 10: The method of Aspect 9, wherein the indication of the averaging parameter associated with the transmitter nonlinear model includes an indication of whether the other wireless communication device is permitted to average, over two or more slots, one or more parameters associated with the transmitter nonlinear model.

Aspect 11: The method of Aspect 10, wherein the indication of whether the other wireless communication device is permitted to average, over the two or more slots, the one or more parameters associated with the transmitter nonlinear model is indicated using one bit.

Aspect 12: The method of any of Aspects 9-11, wherein the indication of the averaging parameter associated with the transmitter nonlinear model includes an indication of a number of slots over which the other wireless communication device is permitted to average one or more parameters associated with the transmitter nonlinear model.

Aspect 13: The method of Aspect 12, wherein the number of slots over which the other wireless communication device is permitted to average the one or more parameters associated with the transmitter nonlinear model is an infinite number of slots.

Aspect 14: The method of Aspect 12, wherein the number of slots over which the other wireless communication device is permitted to average the one or more parameters associated with the transmitter nonlinear model is a finite number of slots.

Aspect 15: The method of any of Aspects 9-14, wherein the indication of the averaging parameter associated with the transmitter nonlinear model is transmitted via an uplink communication, and wherein the uplink communication is one of a PUCCH communication, a MAC-CE communication, or an RRC communication.

Aspect 16: The method of Aspect 9, wherein the indication of the averaging parameter associated with the transmitter nonlinear model is transmitted via a downlink communication, and wherein the downlink communication is one of a DCI communication, a MAC-CE communication, or an RRC communication.

Aspect 17: An apparatus for wireless communication at a device, comprising a processor; memory coupled with the processor; and instructions stored in the memory and executable by the processor to cause the apparatus to perform the method of one or more of Aspects 1-8.

Aspect 18: A device for wireless communication, comprising a memory and one or more processors coupled to the memory, the one or more processors configured to perform the method of one or more of Aspects 1-8.

Aspect 19: An apparatus for wireless communication, comprising at least one means for performing the method of one or more of Aspects 1-8.

Aspect 20: A non-transitory computer-readable medium storing code for wireless communication, the code comprising instructions executable by a processor to perform the method of one or more of Aspects 1-8.

Aspect 21: A non-transitory computer-readable medium storing a set of instructions for wireless communication, the set of instructions comprising one or more instructions that, when executed by one or more processors of a device, cause the device to perform the method of one or more of Aspects 1-8.

Aspect 22: An apparatus for wireless communication at a device, comprising a processor; memory coupled with the processor; and instructions stored in the memory and executable by the processor to cause the apparatus to perform the method of one or more of Aspects 9-16.

Aspect 23: A device for wireless communication, comprising a memory and one or more processors coupled to the memory, the one or more processors configured to perform the method of one or more of Aspects 9-16.

Aspect 24: An apparatus for wireless communication, comprising at least one means for performing the method of one or more of Aspects 9-16.

Aspect 25: A non-transitory computer-readable medium storing code for wireless communication, the code comprising instructions executable by a processor to perform the method of one or more of Aspects 9-16.

Aspect 26: A non-transitory computer-readable medium storing a set of instructions for wireless communication, the set of instructions comprising one or more instructions that, when executed by one or more processors of a device, cause the device to perform the method of one or more of Aspects 9-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device comprising:
   one or more memories; and
   one or more processors, coupled to the one or more memories, configured to:
   receive, from an other wireless communication device, an indication of an averaging parameter associated with a transmitter nonlinear model, wherein receiving the averaging parameter is based at least in part on whether the transmitter nonlinear model is static over two or more slots; and
   estimate the transmitter nonlinear model based at least in part on the indication of the averaging parameter associated with the transmitter nonlinear model.

2. The wireless communication device of claim 1, wherein the indication of the averaging parameter associated with the transmitter nonlinear model includes an indication of whether the wireless communication device is permitted to average, over the two or more slots, one or more parameters associated with the transmitter nonlinear model.

3. The wireless communication device of claim 2, wherein the indication of whether the wireless communication device is permitted to average, over the two or more slots, the one or more parameters associated with the transmitter nonlinear model, is indicated using one bit.

4. The wireless communication device of claim 1, wherein the indication of the averaging parameter associated with the transmitter nonlinear model includes an indication of a number of slots over which the wireless communication device is permitted to average one or more parameters associated with the transmitter nonlinear model.

5. The wireless communication device of claim 4, wherein the number of slots over which the wireless communication device is permitted to average the one or more parameters associated with the transmitter nonlinear model is an infinite number of slots.

6. The wireless communication device of claim 4, wherein the number of slots over which the wireless communication device is permitted to average the one or more parameters associated with the transmitter nonlinear model is a finite number of slots.

7. The wireless communication device of claim 1, wherein the indication of the averaging parameter associated with the transmitter nonlinear model is received via an uplink communication, and wherein the uplink communication is one of a physical uplink control channel (PUCCH) communication, a medium access control (MAC) control element (MAC-CE) communication, or a radio resource control (RRC) communication.

8. The wireless communication device of claim 1, wherein the indication of the averaging parameter associated with the transmitter nonlinear model is received via a downlink communication, and wherein the downlink communication is one of a downlink control information (DCI) communication, a medium access control (MAC) control element (MAC-CE) communication, or a radio resource control (RRC) communication.

9. A wireless communication device comprising:
one or more memories; and
one or more processors, coupled to one or more memories, configured to:
determine one or more coherency factors associated with a transmitter nonlinear model; and
transmit, to an other wireless communication device, an indication of an averaging parameter associated with the transmitter nonlinear model, wherein transmitting the indication of the averaging parameter associated with the transmitter nonlinear model is based at least in part on the one or more coherency factors associated with the transmitter nonlinear model being static over two or more slots.

10. The wireless communication device of claim 9, wherein the indication of the averaging parameter associated with the transmitter nonlinear model includes an indication of whether the other wireless communication device is permitted to average, over the two or more slots, one or more parameters associated with the transmitter nonlinear model.

11. The wireless communication device of claim 10, wherein the indication of whether the other wireless communication device is permitted to average, over the two or more slots, the one or more parameters associated with the transmitter nonlinear model, is indicated using one bit.

12. The wireless communication device of claim 9, wherein the indication of the averaging parameter associated with the transmitter nonlinear model includes an indication of a number of slots over which the other wireless communication device is permitted to average one or more parameters associated with the transmitter nonlinear model.

13. The wireless communication device of claim 12, wherein the number of slots over which the other wireless communication device is permitted to average the one or more parameters associated with the transmitter nonlinear model is an infinite number of slots.

14. The wireless communication device of claim 12, wherein the number of slots over which the other wireless communication device is permitted to average the one or more parameters associated with the transmitter nonlinear model is a finite number of slots.

15. The wireless communication device of claim 9, wherein the indication of the averaging parameter associated with the transmitter nonlinear model is transmitted via an uplink communication, and wherein the uplink communication is one of a physical uplink control channel (PUCCH) communication, a medium access control (MAC) control element (MAC-CE) communication, or a radio resource control (RRC) communication.

16. The wireless communication device of claim 9, wherein the indication of the averaging parameter associated with the transmitter nonlinear model is transmitted via a downlink communication, and wherein the downlink communication is one of a downlink control information (DCI) communication, a medium access control (MAC) control element (MAC-CE) communication, or a radio resource control (RRC) communication.

17. A method of wireless communication performed by a wireless communication device, comprising:
receiving, from an other wireless communication device, an indication of an averaging parameter associated with a transmitter nonlinear model, wherein receiving the averaging parameter is based at least in part on whether the transmitter nonlinear model is static over two or more slots; and
estimating the transmitter nonlinear model based at least in part on the indication of the averaging parameter associated with the transmitter nonlinear model.

18. The method of claim 17, wherein the indication of the averaging parameter associated with the transmitter nonlinear model includes an indication of whether the wireless communication device is permitted to average, over the two or more slots, one or more parameters associated with the transmitter nonlinear model.

19. The method of claim 18, wherein the indication of whether the wireless communication device is permitted to average, over the two or more slots, the one or more parameters associated with the transmitter nonlinear model, is indicated using one bit.

20. The method of claim 17, wherein the indication of the averaging parameter associated with the transmitter nonlinear model includes an indication of a number of slots over which the wireless communication device is permitted to average one or more parameters associated with the transmitter nonlinear model.

21. The method of claim 20, wherein the number of slots over which the wireless communication device is permitted to average the one or more parameters associated with the transmitter nonlinear model is an infinite number of slots.

22. The method of claim 20, wherein the number of slots over which the wireless communication device is permitted to average the one or more parameters associated with the transmitter nonlinear model is a finite number of slots.

23. The method of claim 17, wherein the indication of the averaging parameter associated with the transmitter nonlinear model is received via an uplink communication, and wherein the uplink communication is one of a physical uplink control channel (PUCCH) communication, a medium access control (MAC) control element (MAC-CE) communication, or a radio resource control (RRC) communication.

24. The method of claim 17, wherein the indication of the averaging parameter associated with the transmitter nonlinear model is received via a downlink communication, and wherein the downlink communication is one of a downlink control information (DCI) communication, a medium access control (MAC) control element (MAC-CE) communication, or a radio resource control (RRC) communication.

25. A method of wireless communication performed by a wireless communication device, comprising:
determining one or more coherency factors associated with a transmitter nonlinear model; and
transmitting, to an other wireless communication device, an indication of an averaging parameter associated with the transmitter nonlinear model, wherein transmitting the indication of the averaging parameter associated with the transmitter nonlinear model is based at least in part on the one or more coherency factors associated with the transmitter nonlinear model being static over two or more slots.

26. The method of claim 25, wherein the indication of the averaging parameter associated with the transmitter nonlinear model includes an indication of whether the other wireless communication device is permitted to average, over the two or more slots, one or more parameters associated with the transmitter nonlinear model.

27. The method of claim 26, wherein the indication of whether the other wireless communication device is permitted to average, over the two or more slots, the one or more parameters associated with the transmitter nonlinear model, is indicated using one bit.

28. The method of claim 25, wherein the indication of the averaging parameter associated with the transmitter nonlinear model includes an indication of a number of slots over which the other wireless communication device is permitted to average one or more parameters associated with the transmitter nonlinear model.

29. The method of claim 28, wherein the number of slots over which the other wireless communication device is permitted to average the one or more parameters associated with the transmitter nonlinear model is an infinite number of slots.

30. The method of claim 28, wherein the number of slots over which the other wireless communication device is permitted to average the one or more parameters associated with the transmitter nonlinear model is a finite number of slots.

* * * * *